US008887791B2

(12) United States Patent
Eiterman et al.

(10) Patent No.: US 8,887,791 B2
(45) Date of Patent: Nov. 18, 2014

(54) RESET MECHANISM FOR STORED ENERGY EMERGENCY BARRIERS

(75) Inventors: Alvin Eiterman, Hilliard, OH (US);
Carolyn D. Eiterman, legal representative, Hilliard, OH (US);
Dwayne J. Kornish, Navarre, OH (US)

(73) Assignee: Overhead Door Corporation, Lewisville, TX (US)

( * ) Notice: Subject to any disclaimer, the term of this patent is extended or adjusted under 35 U.S.C. 154(b) by 341 days.

(21) Appl. No.: 13/194,441

(22) Filed: Jul. 29, 2011
(Under 37 CFR 1.47)

(65) Prior Publication Data
US 2013/0025803 A1 Jan. 31, 2013

(51) Int. Cl.
| E06B 9/56 | (2006.01) |
| A47G 5/02 | (2006.01) |
| A47H 1/00 | (2006.01) |
| G01M 99/00 | (2011.01) |
| E06B 9/74 | (2006.01) |
| E06B 9/60 | (2006.01) |

(52) U.S. Cl.
CPC .............. E06B 9/60 (2013.01); G01M 99/008 (2013.01); E06B 9/74 (2013.01)
USPC .......................................... 160/305; 160/313

(58) Field of Classification Search
USPC ......... 160/6–9, 133, 188, 189, 191, 192, 294, 160/300–305, 313, 315
See application file for complete search history.

(56) References Cited

U.S. PATENT DOCUMENTS

| 1,270,964 | A | 7/1918 | McCloud |
| 1,617,439 | A | 2/1927 | Duncanson |
| 1,718,752 | A | 6/1929 | McCloud |
| 2,019,085 | A | * 10/1935 | Miller ............................... 160/8 |
| 2,374,829 | A | 5/1945 | Nardone |
| 2,528,869 | A | * 11/1950 | De Laney ........................ 160/7 |
| 2,564,208 | A | * 8/1951 | Michelman ...................... 160/9 |
| 2,946,377 | A | 7/1960 | Zoll at al. |
| 3,420,121 | A | 1/1969 | Stieg |
| 3,685,567 | A | 8/1972 | Pemberton et al. |
| 3,752,208 | A | 8/1973 | Roberts |
| 4,147,197 | A | 4/1979 | Bailey et al. |
| 4,664,170 | A | 5/1987 | Labelle |
| 5,022,452 | A | 6/1991 | Burrell |
| 5,123,134 | A | 6/1992 | Alberto et al |

(Continued)

OTHER PUBLICATIONS

Protest filed with the U.S. Patent & Trademark Office on Aug. 6, 2009 in U.S. Appl. No. 11/976,363.

(Continued)

Primary Examiner — Katherine Mitchell
Assistant Examiner — Jeremy Ramsey
(74) Attorney, Agent, or Firm — Gardere Wynne Sewell LLP

(57) ABSTRACT

A stored energy emergency barrier release device comprising a barrier and a barrel member for storing the barrier thereon. The barrel member is rotatable on a stationary counterbalance shaft and a push down shaft. The release device further includes a push down spring coupled to the push down shaft for storing potential energy in order to exert a closing force on the barrier when the release device is positioned from an engaged position to a released position. The release device includes a reset mechanism interfaced with the push down spring for transmitting a lifting torque to the push down spring in response to moving the barrier from a first position to a second position to store energy within the push down spring.

23 Claims, 4 Drawing Sheets

(56) References Cited

U.S. PATENT DOCUMENTS

| | | | |
|---|---|---|---|
| 5,203,392 A | 4/1993 | Shea | |
| 5,245,879 A | 9/1993 | McKeon | |
| 5,253,693 A * | 10/1993 | Marlatt et al. | 160/7 |
| 5,261,186 A | 11/1993 | Saino | |
| 5,263,527 A | 11/1993 | Marlatt et al. | |
| 5,353,859 A | 10/1994 | Oltahfer et al. | |
| 5,355,927 A | 10/1994 | McKeon | |
| 5,482,103 A | 1/1996 | Burgess et al. | |
| 5,542,460 A * | 8/1996 | McKeon | 160/7 |
| 5,576,581 A | 11/1996 | Iannuzzi et al. | |
| 5,613,321 A | 3/1997 | Rizkovsky | |
| 5,839,766 A | 11/1998 | Iannuzzi et al. | |
| 5,893,234 A | 4/1999 | McKeon | |
| 5,896,907 A | 4/1999 | Dever et al. | |
| 5,931,212 A | 8/1999 | Mullet et al. | |
| 6,014,307 A | 1/2000 | Crimmins | |
| 6,055,885 A | 5/2000 | Shea | |
| 6,123,134 A | 9/2000 | Thomas et al. | |
| 6,155,234 A | 12/2000 | Hartke et al. | |
| 6,155,324 A * | 12/2000 | Elliott et al. | 160/1 |
| 6,196,943 B1 | 3/2001 | Chen | |
| 6,338,412 B1 | 1/2002 | Serres et al. | |
| 6,388,412 B1 | 5/2002 | Reed et al. | |
| 6,401,792 B1 | 6/2002 | Mullet et al. | |
| 6,422,965 B1 | 7/2002 | Balli et al. | |
| 6,484,784 B1 | 11/2002 | Weik, III et al. | |
| 6,530,863 B2 | 3/2003 | Balli et al. | |
| 6,712,116 B2 | 3/2004 | Beaudoin et al. | |
| 6,737,823 B2 | 5/2004 | Reed et al. | |
| 6,890,279 B2 | 5/2005 | Ryberg | |
| 6,959,751 B2 | 11/2005 | Savard et al. | |
| 6,986,378 B2 | 1/2006 | Beaudoin et al. | |
| 7,055,283 B2 | 6/2006 | Hsieh | |
| 7,086,441 B2 | 8/2006 | Barriault et al. | |
| 8,162,026 B1 * | 4/2012 | Lundahl | 160/191 |
| 2002/0111242 A1 | 8/2002 | Balli et al. | |
| 2009/0108245 A1 | 4/2009 | Daus et al. | |
| 2011/0099914 A1 | 5/2011 | Herrin | |

OTHER PUBLICATIONS

Written Opnion issued on Apr. 27, 2010 in corresponding PCT Application No. PCT/US2008/080683.

International Search Report and Written Opinion issued on Dec. 18, 2008.

\* cited by examiner

RESET MECHANISM FOR STORED ENERGY EMERGENCY BARRIERS

TECHNICAL FIELD

The present invention relates to stored energy type barrier installations, more particularly to stored energy fire doors and fire grills, and even more particularly to reset mechanisms and processes for restoring stored potential energy to fire doors, grills, and the like after release of such energy.

BACKGROUND

In typical stored energy type movable barrier installations, stored energy is accumulated and then released in order to facilitate movement of the barrier between its opened and closed positions in the event of a fire or other emergency. Thus, in the case of a typical fire door, the accumulated stored energy, when released, causes the door to move from the open position to the closed position because there is not enough stored energy to overcome the effect of gravity, which therefore moves the door from the open position to the closed position. When in the closed position, the door closes off the area in which the fire is present. In the case of an emergency egress type grill, the accumulated stored energy, when released, moves the door from its closed position to the open position, in order to enable egress for those from the area in which the fire exists. However, under either circumstance, once the stored energy is released, the installation must be reset to again store the required potential energy to enable the doors or grill's respective closing or opening in the event of a subsequent emergency.

The restoration of this potential energy has typically required the use of tools, and in the case where a fire door or fire curtain is mounted above the ceiling, the removal of access panels or ceiling tiles. Such resetting has also typically required on-site visits by skilled technicians, and since fire doors must be periodically tested (i.e., closed under simulated fire conditions), this testing can become not only cumbersome, but particularly costly. It is therefore the principal purpose of this invention to avoid these and other disadvantages of existing resetting approaches.

SUMMARY

Embodiments of the present invention disclose an improved stored energy emergency barrier release device for providing and restoring the stored energy in a stored energy type movable barrier installation following a simulation/test or emergency which results in a release of the barrier. Furthermore, embodiments provided herein enable the barrier to be selectively moved between the open and closed positions during normal door operation (i.e., door movement other than as a result of an emergency condition or a test/simulation) without requiring actuation and/or resetting of the stored energy release device each time the barrier is moved.

The stored energy emergency barrier release device includes a barrel member for storing the barrier thereon, the barrel being rotatable on a stationary counterbalance shaft and a push down shaft. A push down spring is coupled to the push down shaft for storing potential energy therein for exerting a moving force on the barrier when the release device is, in response to an emergency condition or simulation/test, positioned from an engaged position to a released position. The moving force is sufficient to move the barrier from a first position (e.g., an open position) to a second position (e.g., a closed position). A reset mechanism is interfaced with the push down spring for transmitting a torque to the push down spring in response to moving the barrier to its original or first position from the second position in order to restore potential energy to the push down spring. Embodiments disclosed herein enable the reset mechanism to be utilized at floor level and without the use of tools in order to restore potential energy to the push down spring.

For a more complete understanding of the present invention, including additional features, objects and advantages thereof, reference is now made to the following detailed description taken in conjunction with the drawings, in which:

BRIEF DESCRIPTION OF THE DRAWINGS

FIG. 1A is a detail view of a release handle in the released position;

DETAILED DESCRIPTION

Figure 1:
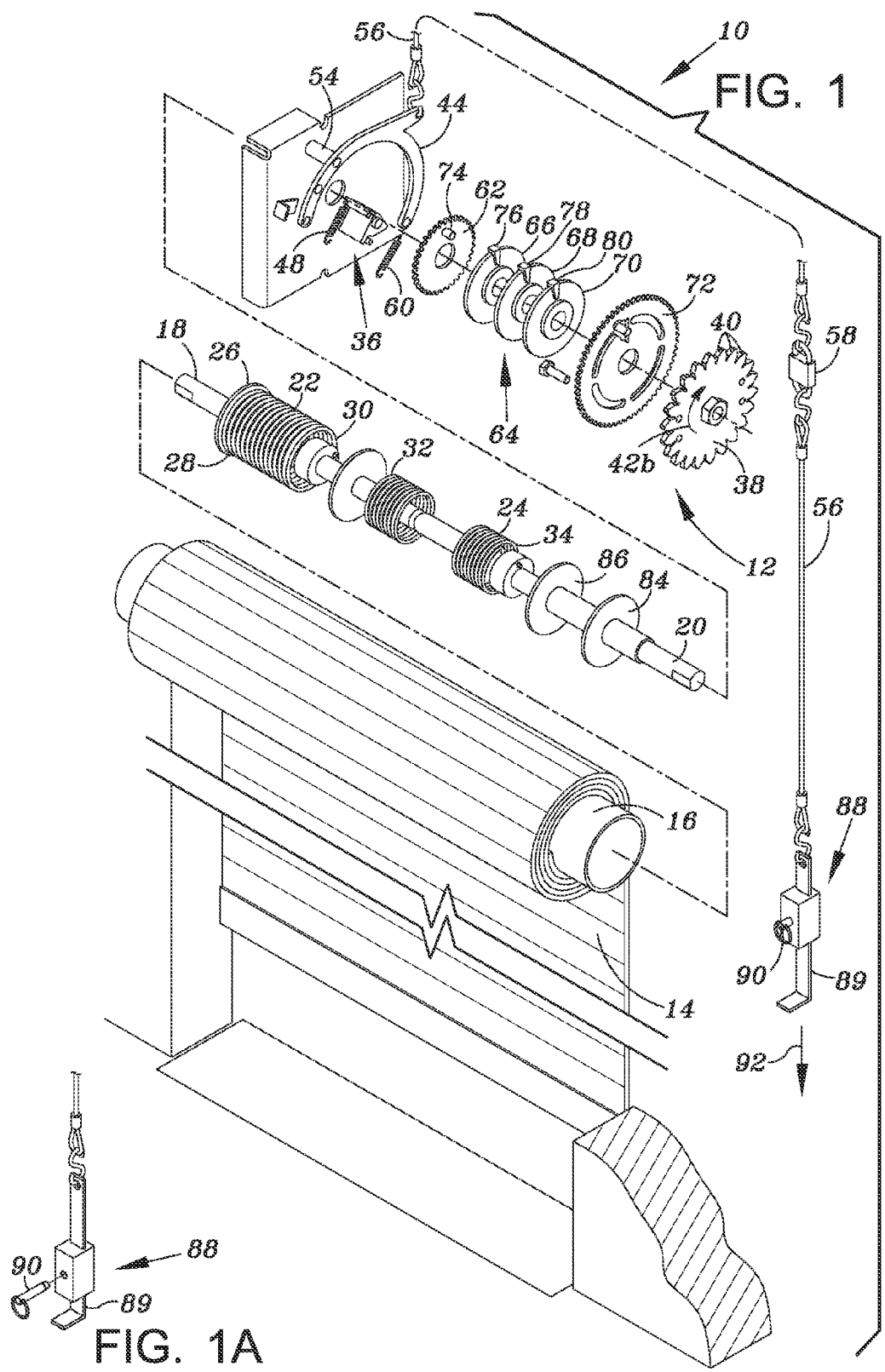
FIG. 1 is an exploded perspective view of a stored energy emergency barrier release device in which a reset mechanism is employed to advantage.

In the description which follows, like parts are marked throughout the specification and drawings with the same reference numerals, respectively. The drawings may not be to scale and certain features may be shown exaggerated in scale or in somewhat schematic form in the interest of clarity and conciseness.

FIG. 1 is a diagram illustrating a stored energy emergency barrier release device 10 having a reset mechanism 12. Briefly, stored energy release device 10 is operable to exert a closing force on an emergency barrier 14 to move barrier 14 from an open position to a closed position in response to either (i) a fire/emergency condition or (ii) a simulation/test of release device 10. In operation, reset mechanism 12 is configured to enable the storage of energy within the stored energy release device 10 in response to positioning emergency barrier 14 from its initial closed position to the open position, either upon installation of release device 10 or after barrier 14 has closed from a fire or a simulation/test of release device 10. According to one aspect of the present invention, barrier 14 is positionable between the open and closed positions during non-emergency or non-testing conditions without releasing the potential energy stored in release device 10, thereby obviating the need to reset release device 10 each time the barrier 14 is closed or otherwise moved. Embodiments also provide a release device 10 that can be easily reset via reset mechanism 12 at ground level without requiring the use of tools or multiple complicated reset steps.

Referring to FIG. 1, barrier 14 is coupled to and storable on a rotatable barrel 16 as barrier 14 is raised to the open position. Barrier 14 and barrel 16 are counterbalanced via a counterbalance spring 22 and, as discussed in further detail below, are supported on a stationary counterbalance shaft 18 and a coaxially aligned and rotatable push down shaft 20 to facilitate winding and unwinding of barrier 14 therefrom. In operation, counterbalance spring 22 counters the weight of barrier 14 to facilitate easy movement of barrier 14 as it is positioned between the open and closed positions, such as, for example, during normal barrier movement (i.e., movement in response to a non-emergency condition or non-testing condition).

In addition to counterbalance spring 22, stored energy release device 10 also includes a push down spring 24. As discussed in further detail below, push down spring 24, when tensioned, exerts a moving or closing force on barrier 14 in response to a fire condition or a test/simulation to ensure that barrier 14 is forced to the closed position. Counterbalance spring 22 and push down spring 24 are preferably disposed within barrel 16 to enable controlled rotation thereof; however, it should be understood that springs 22 and 24 may be otherwise disposed.

In the embodiment illustrated in FIG. 1, counterbalance spring 22 is coupled to a plug member 26 that is secured to and rotatable with barrel 16 at spring first end 28. Second end 30 of counterbalance spring 22 is secured to counterbalance shaft 18, which remains stationary relative to barrel 16, such that as barrier 14 is opened or closed, potential energy is either stored or dissipated in spring 22 via rotation of barrel 16. This provides a balancing force on barrier 14 to assist in opening/closing of barrier 14. In FIG. 1, a first end 32 of push down spring 24 is coupled to counterbalance shaft 18 so as to remain stationary relative to barrel 16. A second end 34 of push down spring 24 is coupled to push down shaft 20 such that as push down shaft 20 rotates, as discussed in further detail below, potential energy is either stored or dissipated therefrom, depending on the rotational movement of push down shaft 20.

Figure 2:
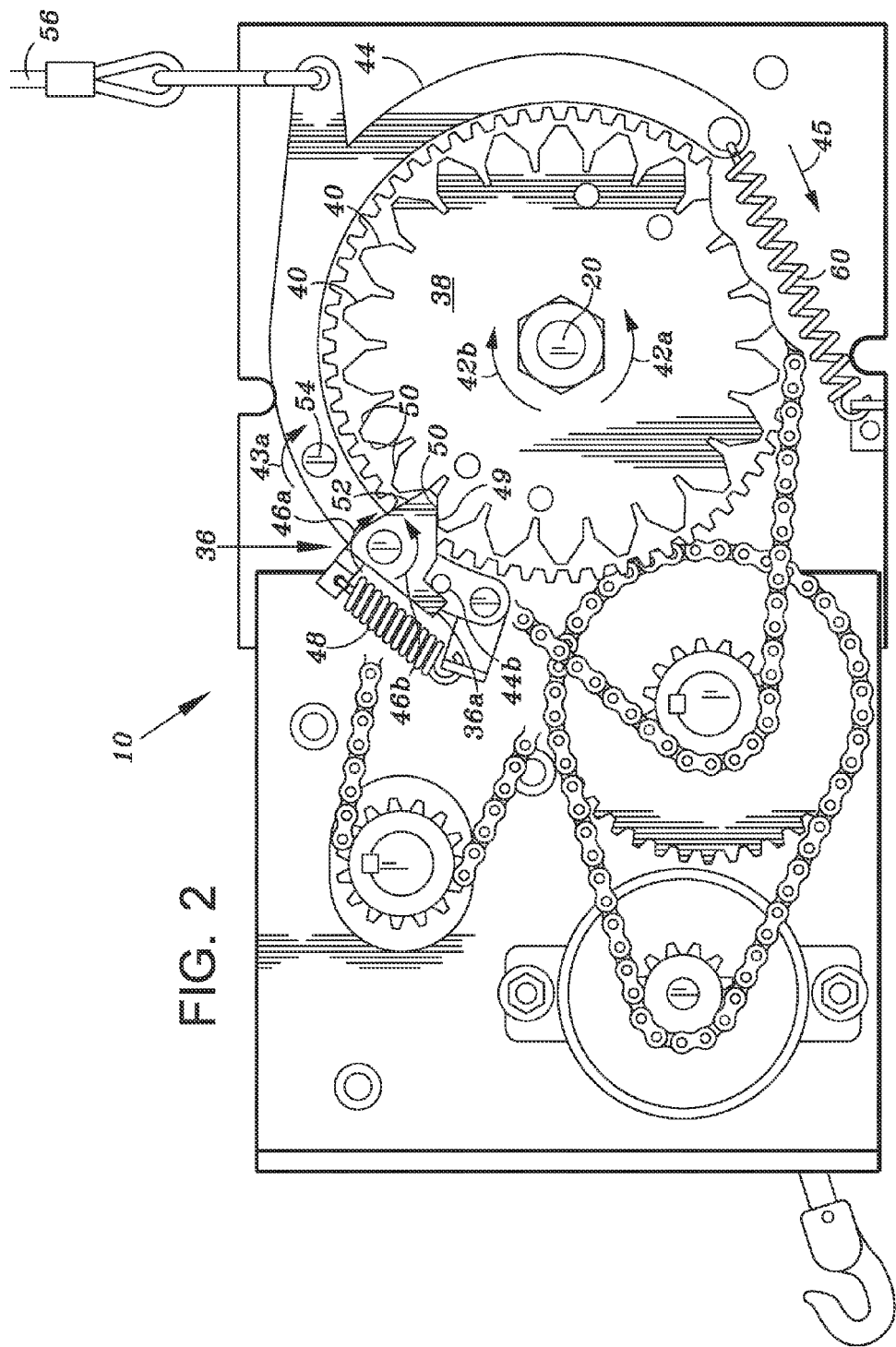
FIG. 2 is an end view of a portion of the release device illustrated in FIG. 1 and configured in an engaged position.
Figure 3:
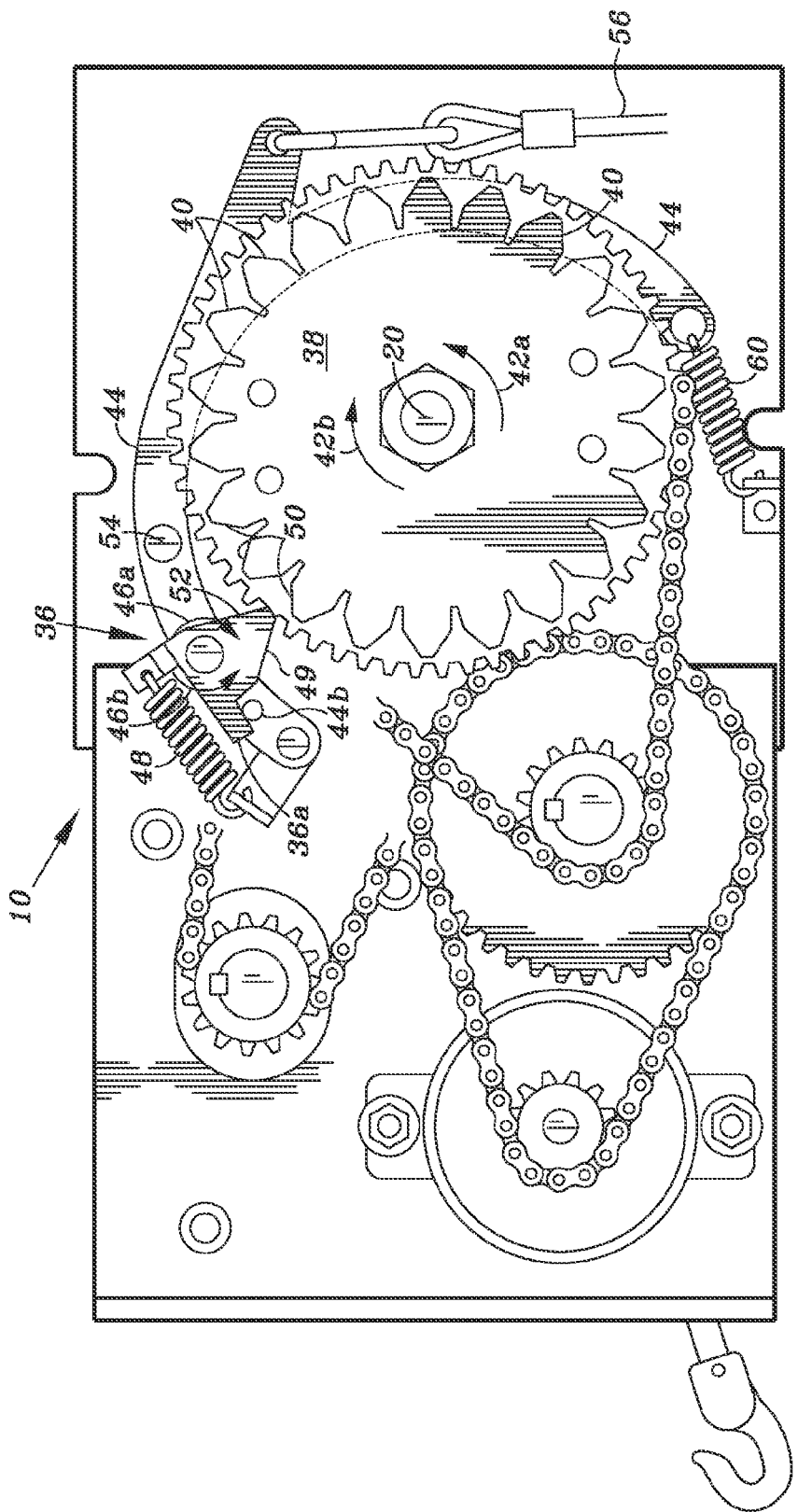
FIG. 3 is an end view of a portion of the release device illustrated in FIG. 1 and configured in a released position.

Referring specifically to FIGS. 1-3, release device 10 is operable between an engaged position (FIG. 2) to prevent the release of stored energy from push down spring 24, and a disengaged position (FIG. 3), to facilitate the release of stored energy from push down spring 24 in order to exert a downward or closing force on barrier 14. After release device 10 is positioned in the disengaged position, reset mechanism 12 is operable to reset and/or otherwise facilitate the storage of potential energy within release device 10. Reset mechanism 12 includes push down shaft 20, push down spring 24 and a ratchet pawl 36 disposed on a lever arm 44. As discussed in below, lever arm 44 pivotable to facilitate movement of ratchet pawl 36 into and out of engagement with a tension wheel 38. Tension wheel 38 is keyed or otherwise securely fastened to push down shaft 20 such that upon movement of push down shaft 20, tension wheel 38 is movable therewith.

Referring specifically to FIGS. 2 and 3, tension wheel 38 includes a plurality of teeth 40 disposed circumferentially around tension wheel 38 and is cooperable with ratchet pawl 36 such that when storing energy within push down spring 24, ratchet pawl 36 enables rotation of tension wheel 38, and thus push down shaft 20, in the direction the arrow 42a and prevents opposite movement in the direction of arrow 42b. In particular, ratchet pawl 36 is pivotably attached to a biased lever arm 44 such that as tension wheel 38 is rotated in the direction of arrow 42a, ratchet pawl 36 is rotatable in the direction of arrow 46a to enable a surface 52 of ratchet pawl 36 to slideably engage and travel over surface 50 of an adjacently positioned tooth 40. After traveling over surface 50 and the apex of the tooth 40, a tensioned spring 48 exerts a retraction force on ratchet pawl 36 to retract ratchet pawl 36 until arm 36a contacts a pin 44b to prevent further rotation of pawl 36. This enables pawl 36 to rest against the next adjacently positioned tooth 40. Rotation of tension wheel 38 in the direction of arrow 42b (and thus, the release of stored energy in push down spring 24) is prevented as a result of contact between rear surface 49 and surface 50 of tension wheel 38. For example, referring specifically to FIG. 2, because ratchet pawl 36 is prevented from further rotation in the direction of arrow 46b, surface 49 blocks rotation of tension wheel 38 in the direction of arrow 42b and the release of stored energy in push down spring 24; accordingly, movement of push down shaft 20 is prevented. When release device 10 is configured as such (i.e., the engaged position), barrier 14 is prevented from closing as a result of stored energy in push down spring 24.

In FIGS. 2 and 3, when releasing stored energy from push down shaft 20 (i.e., when configuring release device in the disengaged position), lever arm 44 is pivotable about pivot point 54 such that ratchet pawl 36 can be lifted or otherwise removed from tension wheel 38. In operation, as tension in wire 56 is released, such as for example, when a fusible link 58 (FIG. 1) melts, a biasing mechanism 60 exerts a tension force in the direction of arrow 45 (FIG. 2) to cause lever arm 44 to rotate clockwise about pivot point 54 to lift ratchet pawl 36 away from tension wheel 38, thereby positioning release device 10 in the disengaged position. This enables tension wheel 38, and thus, push down shaft 20, to freely rotate in the direction of arrow 42b to release the stored energy in push down spring 24. As a result, barrier 14 unwinds from barrel 16 until barrier 14 is in the closed position. As tension is applied to wire 56 (i.e., when fusible link 58 is replaced), lever arm 44 rotates counter-clockwise about pivot point 54 to reengage ratchet pawl 36 with tension wheel 38 (FIG. 2) to otherwise place release device 10 in the engaged position.

Figure 4:
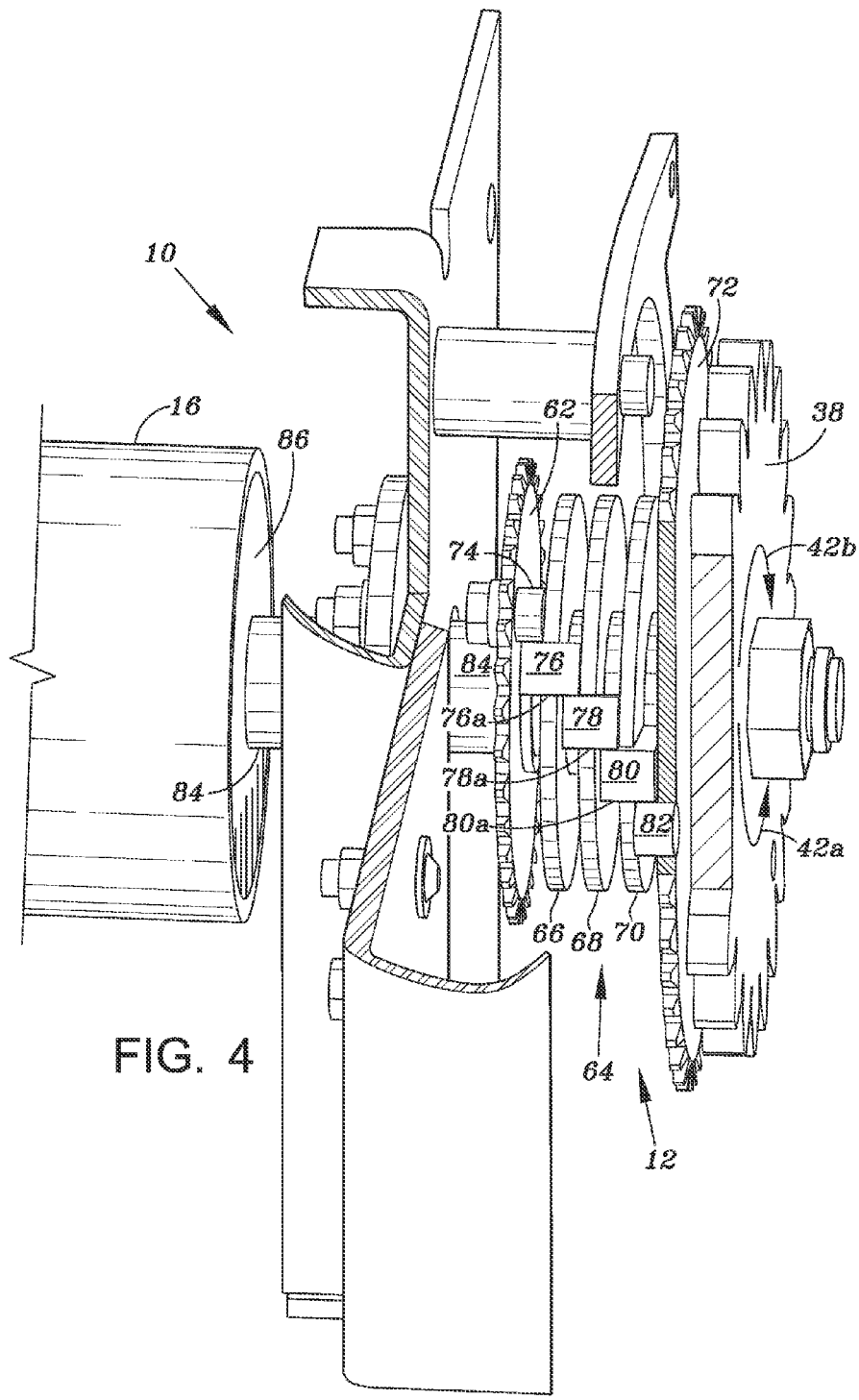
FIG. 4 is a perspective view of a portion of the stored energy emergency barrier release device of FIGS. 1-3.

Referring now to FIGS. 1 and 4, when it is desired to reset and store potential energy in release device 10 (during initial set-up, after a drop test or after a fire in which barrier 14 was released), reset mechanism 12 is operable to facilitate the storage of potential energy in spring 24. In the embodiment illustrated in FIGS. 1 and 4, reset mechanism 12 further includes a clutch assembly 64 and a slotted sprocket 72 rotatably disposed on push down shaft 20 and mounted between a roller chain sprocket 62 and tension wheel 38. In operation, roller chain sprocket 62, which is rotatable via a chain operator, a crank operator and/or a powered operator, is configured to engage clutch assembly 64 such that when sprocket wheel 62 rotates, a lifting torque is transferred from roller chain sprocket 62, to tension wheel 38 via clutch assembly 64.

Preferably, clutch assembly 64 includes clutch rings 66, 68 and 70 disposed between roller chain sprocket 62 and slotted sprocket 72, each being secured to transmit a lifting torque for initially raising barrier 14 (i.e., upon installation, after a system test or after an actuation or release device 10) and to transmit a closing torque to exert a closing force in response to a system test or emergency condition. In particular, roller chain sprocket 62 contains an extension member 74 extending therefrom and engageable with a corresponding extension 76 disposed on clutch ring 66. Remaining clutch rings 68 and 70 each contain an extension 78 and 80, respectively, that are adjacently positioned so as to transmit the torque to an extension 82 on slotted sprocket 72. Slotted sprocket 72 is securely fastened to tension wheel 38 such that as slotted sprocket 72 rotates, tension wheel 38 moves therewith. Accordingly, as roller chain sprocket 62 is rotated (sprocket 62 is securely fastened to bushing 84 and drive plug 86, which rotate with barrel 16 either in response to chain operation, crank operation, an operator or manual lift-up operation of barrier 14), extensions 74, 76, 78, 80 and 82 are in contact (see FIG. 4) such that the rotational force from extension 74 on sprocket 62 will transfer to adjacently positioned extensions 76, 78, 80 and onto extension 82 of slotted sprocket 72, so as to rotate tension wheel 38. As discussed above, rotation of tension wheel 38 causes rotation of push down shaft 20, which stores potential energy in push down spring 24. When release device 10 is in the engaged position, ratchet pawl 36 and tension wheel 38, as previously described, prevent rotation of push down shaft 20 in the opposite direction thereby preventing the release of stored energy from push down spring 24, unless release device 10 is tested or a fire or emergency condition occurs.

During an emergency or fire condition, release device 10 is activated by means of fusible link 58 or otherwise. In the embodiment illustrated in FIG. 1, if fusible link 58 is exposed to elevated temperatures, fusible link 58 melts/separates thereby releasing tension in cable 56, which in turn causes ratchet lever 44 to rotate clockwise to disengage pawl 36 from tension wheel 38 under the tension of biasing mechanism 60. Clutch 64 transmits the push down force generated by push down spring 24 via contact between extensions 74, 76, 78, 80 and 82 to sprocket 62, which is coupled to barrier 14 and spring barrel 16 by bushing 84. In particular and referring back to FIG. 1, roller chain sprocket 62 is coupled to or otherwise integral with bushing 84, which is rotatably disposed relative to push down shaft 20. Bushing 84 further includes an idler plug 86 disposed on an end opposite of sprocket 62 and coupled to barrel 16 such that upon rotation of roller chain sprocket 62, rotational forces are transmitted through bushing 84 and idler plug 86 to rotate barrel 16 to unwind barrier 14 from barrel 16 for closing thereof. Accordingly, barrier 14 is closed by the push down force generated by push down spring 24 until barrier 14 reaches the floor or its lowermost position.

Referring to FIGS. 1 and 1A, a handle release 88 is provided to disengage release device 10 for simulation/testing purposes. Handle release 88 is coupled to release device 10 via cable 56 and preferably disposed on a nearby wall. Handle release 88 is unlocked by removing a pin 90 to facilitate vertical movement of a handle member 89 to release tension in cable 56 (FIG. 1A). Once tension in cable 56 is released, lever arm 44 rotates in a clockwise direction to separate ratchet pawl 36 from teeth 40 in order to release tension wheel 38 therefrom and place release device 10 in the disengaged position (FIGS. 2 and 3). As previously discussed, after tension wheel 38 is released, stored energy from push down spring 24 exerts a force on barrel 16 to facilitate rapid closing of barrier 14. After testing has been completed, handle 89 is pulled downward in the direction of arrow 92 and pin 90 reinserted to prevent movement of handle 89. The repositioning of handle 89 tensions biasing mechanism 60 by causing lever 44 to rotate in the direction of arrow 42a to thereby engage ratchet pawl 36 with tension wheel 38 in order to place release device 10 in the engaged position. Barrier 14 can then be moved from the closed position to the open position, thus rotating push down shaft 20 and tension wheel 38 via reset mechanism 12 to store potential energy in push down spring 24, as previously discussed, until an emergency condition or drop test.

According to embodiments disclosed herein, barrier 14 can be closed without actuating or otherwise releasing the stored energy in release device 10, and specifically, push down spring 24, thus obviating the need to reset or otherwise restore stored energy to push down spring 24 each time barrier 14 is moved from its open or stored energy position. In particular and referring back to FIG. 1, as discussed above, movement of roller chain sprocket 62 and thus bushing 84 rotate barrel 16 to wind and unwind barrier 14 from barrel 16. For example, when it is desired to close barrier 14 during non-emergency conditions, roller chain sprocket 62 is rotated in the direction of arrow 42b, which causes barrel 16 to rotate in the same direction to unwind barrier 14 from barrel 16.

Referring specifically to FIG. 4, during operation, as sprocket 62 rotates one full revolution in the direction of arrow 42b, extension 74 is positioned to contact surface 76a of extension 76, which continuing rotation thereby causes rotation of clutch ring 66. A full revolution of clutch ring 66 enables extension 76 to contact surface 78a on clutch ring 68 such that upon further rotation, causes rotation of clutch ring 68. Likewise, a full revolution of clutch ring 68 enables extension 78 to contact surface 80a on clutch ring 70 to cause rotation thereof. Finally, continued rotation of clutch ring 70 causes extension 80 to contact extension 82 on slotted sprocket 72. When in this position (i.e., after three revolutions), barrier 14 is fully closed. It should be understood, however, that depending on the height of barrier 14, additional clutch rings 66, 68 and/or 70 may be added or removed from push down assembly 12. When raising barrier 14, rotational movement of clutch rings 66, 68 and 70 and thus, movement of extensions 74, 76, 78, 80 and 82, occurs in reverse fashion until extensions 74, 76, 78, 80 and 82 are configured to transmit the closing torque to tension wheel 38 as discussed above.

According to embodiments disclosed herein, stored energy emergency barrier release device 10 is preferably provided with a governor (not illustrated) to control the barrier drop speed between 6 inches to 24 inches per second. In particular, a belt or chain is trained around slotted sprocket 72 with the opposite end of the belt/chain used to couple to a governor on a separately disposed shaft. Accordingly, during an emergency or test condition, as slotted sprocket 72 and push down shaft 20 rotate to cause movement of barrier 14, the governor regulates the closing speed of barrier 14. Since during normal barrier operation slotted sprocket 72 remains stationary, the governor will not impede or otherwise resist movement of barrier 14 during non-emergency/testing conditions. Furthermore, while embodiments disclosed herein discuss storing potential energy in push down spring 24 for exerting a closing force, it should be understood that release device 10 is configurable to provide an opening force to move a barrier 14, such as for example, a grill type barrier.

Although specific embodiments have been described in detail, those skilled in the art will also recognize that various substitutions and modifications may be made without departing from the scope and spirit of the appended claims.

What is claimed is:

1. A stored energy emergency barrier release device, comprising:
   a barrier;
   a barrel member for storing the barrier thereon, the barrel member rotatable on a stationary counterbalance shaft and a rotatable push down shaft;
   a push down spring coupled to the push down shaft for storing potential energy to exert a moving force on the barrier; and
   a reset mechanism disposed on the push down shaft, the reset mechanism positionable between an engaged position and a released position, the reset mechanism comprising:
   a clutch assembly;
   a drive wheel coaxially aligned with a first side of the clutch assembly, the drive wheel interfaced with a drive mechanism to move the barrier between a first position and a second position when a release device is in the engaged position; and
   a tension wheel coaxially aligned with a second side of the clutch assembly, the tension wheel operable to resist the rotation of the push down shaft when the release device is positioned in the engaged position, and to permit rotation of the push down shaft when the release device is positioned in the released position to enable the push down spring to release the potential energy and move the barrier to the first position; and wherein moving the barrier from the first position to the second position tensions the push down spring and stores energy in the push down spring.

2. The release device of claim 1, wherein the first position is a closed position.

3. The release device of claim 1, wherein the clutch assembly includes a plurality of clutch plates rotatably disposed on the push down shaft.

4. The release device of claim 3, further comprising a sprocket secured to and rotatable with the tension wheel.

5. The release device of claim 4, further comprising a governor movable with the tension wheel to regulate the rotational speed of the tension wheel and therefore the barrier.

6. The release device of claim 1, wherein the first position is a closed position and wherein the reset mechanism is operable to transmit a closing torque from the push down spring to the barrel to move the barrier from the second position to the first position.

7. The release device of claim 1, wherein the drive wheel is a roller chain sprocket.

8. The release device of claim 1 further comprising a counterbalance spring for balancing the weight of the barrier.

9. The release device of claim 1, further comprising a ratchet pawl engageable with the tension wheel when the release device is in the engaged position, the ratchet pawl configured to prevent the release of potential energy within the push down spring when the ratchet pawl engages the tension wheel.

10. The release device of claim 9, further comprising a fusible link, wherein the ratchet pawl is released in response to melting of the fusible link.

11. A stored energy emergency barrier release device, comprising:
   a barrier;
   a barrel member for storing the barrier thereon, the barrel member rotatable on a stationary counterbalance shaft and a rotatable push down shaft;
   a counterbalance spring for balancing the weight of the barrier;
   a push down spring operable to store potential energy to exert a closing force on the barrier when the release device is positioned from an engaged position to a released position, and wherein the barrier is movable between an open position and a closed position while the release device remains in the engaged position; and
   a reset mechanism engaging the push down spring, the rest mechanism including a clutch assembly and a tension wheel, the reset mechanism engaged with a drive source for transmitting a torque through the clutch assembly and the tension wheel to rotate the push down shaft and tension the push down spring for storing energy therein as the barrier is positioned from the closed position to the open position.

12. The release device of claim 11, wherein a first end of the push down spring is coupled to the counterbalance shaft and the second end of the push down spring is coupled to the push down shaft.

13. The release device of claim 11, wherein the tension wheel is coupled to the push down shaft, the push down shaft rotatable to release the stored energy in response to a ratchet pawl disengaging the tension wheel to exert the closing force on the barrel to close the barrier.

14. The release device of claim 11, further comprising a ratchet pawl engageable with a tension wheel the release device is in the engaged position, the ratchet pawl configured to prevent the release of potential energy within push down spring when the ratchet pawl engages the tension wheel.

15. The release device of claim 14, wherein the ratchet pawl is released in response to movement of a release handle.

16. The release device of claim 14, wherein the ratchet pawl is released in response to melting of a fusible link.

17. The release device of claim 14, wherein the ratchet pawl is disposed on a pivotable lever arm to engage and disengage the tension wheel.

18. The release device of claim 13, further comprising a biasing mechanism biasing exerting a force on the lever arm to rotate the ratchet pawl away from the tension wheel.

19. The release device of claim 11, further comprising a release handle for configuring the release device from the engaged position to the released position.

20. The release device of claim 17, further comprising a release cable extending between a release handle and the pivotable lever arm.

21. The release device of claim 9, wherein the ratchet pawl is rotatably affixed onto a pivot point and coupled with a tension spring for maintaining the ratchet pawl at the engaged position or the released position.

22. The release device of claim 11, wherein the reset mechanism receives external energy at a roller chain sprocket engaged with the clutch assembly.

23. The release device of claim 11, wherein the reset mechanism further includes a slotted sprocket engaged with the clutch assembly, the slotted sprocket coupled with the tension wheel.

* * * * *